May 19, 1931. E. B. SHAND ET AL 1,806,313
SEAL FOR METAL TANK RECTIFIERS AND THE LIKE
Filed July 30, 1927

WITNESSES:
R. J. Butler
O. B. Buchanan

INVENTORS
Errol B. Shand &
Lloyd Smede
BY
Wesley T. Carr
ATTORNEY

Patented May 19, 1931

1,806,313

UNITED STATES PATENT OFFICE

ERROL B. SHAND AND LLOYD SMEDE, OF PITTSBURGH, PENNSYLVANIA, ASSIGNORS TO WESTINGHOUSE ELECTRIC & MANUFACTURING COMPANY, A CORPORATION OF PENNSYLVANIA

SEAL FOR METAL-TANK RECTIFIERS AND THE LIKE

Application filed July 30, 1927. Serial No. 209,539.

Our invention relates to vacuum-tight seals, and it has particular relation to such seals for metal-tank mercury-vapor rectifiers, insulators, pot-heads and other joints for cables, and other devices wherein a vacuum-tight seal is required between a metal part and a porcelain or other insulating part.

A more particular object of our invention is to provide a satisfactory vacuum-tight seal between the metal and the porcelain tubular members, such as are utilized for insulating the several electrodes in metal-tank rectifiers.

A still further object of our invention is to provide a novel metallic glaze on the porcelain member, by means of which a vacuum-tight joint is made with the metal tank or cylindrical member.

A still further object of our invention is to provide a novel helically wound asbestos washer in which the fibers are all disposed substantially circumferentially, for the purpose of preventing leakage, and particularly for preventing the mercury or mercury vapor from getting into contact with the metallic vacuum-tight joint just mentioned.

Figure 1:
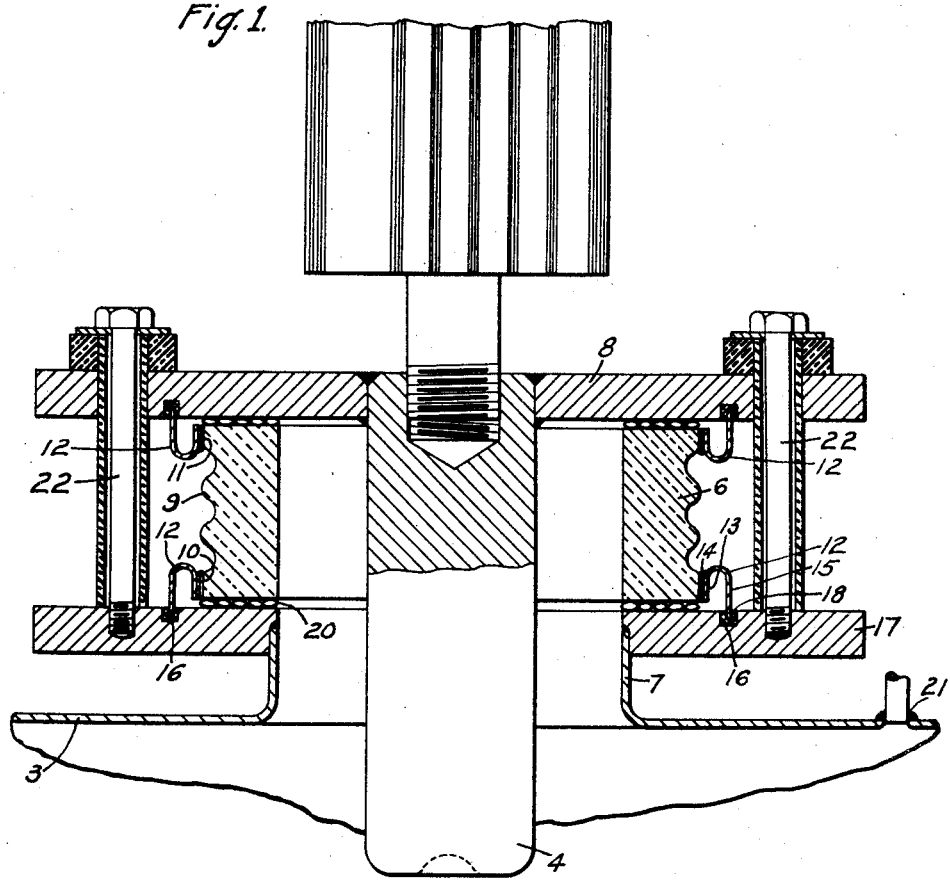
Figure 2:
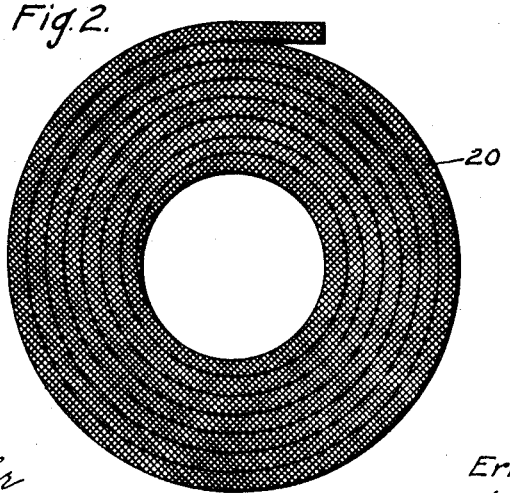

With the foregoing and other objects in view our invention consists of the several parts and combinations hereinafter described and claimed and illustrated in the accompanying drawings, wherein Figure 1 is a sectional view of a part of a metal-tank rectifier embodying our invention, and Fig. 2 is a plan view of one of the washers.

Our invention is shown, for illustrative purposes, as being embodied in a large mercury-arc rectifier comprising an evacuated metal tank shown at 3, although its field of application is by no means limited to such devices. As our invention relates solely to the sealing means, which is illustrated in connection with the joints for one of the anode members 4, and parts associated therewith, we have not deemed it necessary to illustrate the conventional parts of a metal-tank rectifier, such as the insulated cathode member, the various shielding means, the details of the cooling apparatus, the starting apparatus, etc. It will be understood that any usual or desired form of construction may be utilized for the parts such as those just mentioned.

Our improved seal comprises means for effecting a vacuum-tight joint between a porcelain insulator 6, such as an insulator which separates a tubular metallic member 7 projecting from the top of a rectifier tank 3, or any other device, and a metallic member such as the said member 7, or an anode cap member 8 from which depends the anode 4 hereinabove mentioned.

According to our invention, the outside surface of the ceramic or porcelain member 6 is glazed with a suitable ceramic glaze 9 which is susceptible of receiving, in turn, a metallic glaze 10 or 11. The ceramic glaze 9 may be a white transparent glaze such as that produced by the following constituents:

| | Per cent by weight |
|---|---|
| Feldspar | 35.0 |
| Flint | 30.0 |
| American ball clay | 16.0 |
| Whiting | 16.0 |
| ZnO | 3.0 |

The metallic glaze 10 is then applied on that portion of the outer surface of the ceramic member that adjoins the tubular metal-tank projection in order to provide a metallic surface with which a good vacuum-tight joint may be made with the said metallic projection. A similar coating 11 is provided at the other end of the porcelain member for making a similar joint with the metallic anode cap member 8.

The metallic glaze which we utilize consists of chloro-platinic acid suspended in essential oils, such as lavender, cloves and spice. The metallic glaze just mentioned is painted upon the white glaze and allowed to dry, after which the porcelain member is put into a furnace which is slowly heated to a temperature of the order of 750° C. and then slowly cooled again to room temperature.

The result is a lustrous, silvery surface, which is metallic, has good electrical conductivity, and can be electroplated or soldered. Tests have shown that the glazed surface adheres to the porcelain with a strength substantially equal to the strength of the body of the porcelain and with a closeness which renders the joint vacuum-tight.

An annular sheet-metal member 12, preferably made of copper, and having an arch-like, or J-shaped, cross section, is spun from a copper washer and placed around the ceramic member 6 which has been prepared as just described. The outer surface of the short leg 13 of the J is soldered, as at 14, against the metallic glaze, the parts being first tinned in the usual way, or the metallic glaze may be first strengthened by electroplating and then soldered, the only precaution necessary being that corrosive fluxes must not be utilized in the soldering, as these are found to attack the glaze. The end of the long leg 15 of the J is inserted in an annular groove 16 provided in the top surface of a metallic annular flange 17 surrounding, and forming an integral part of, the tubular projection 7 of the metal tank, and solder 18 is then poured into the groove in such manner as to effect a vacuum-tight solder joint between the metal flange member 17 and the annular copper member 12.

The joint just described may be soldered very easily, in such manner as to render the same vacuum-tight, and is designed for all applications where a metal-to-insulator joint is needed, as in insulators, pot-heads, and cable-joints in general, as well as in metal-tank rectifiers, vacuum switches, and other devices.

When our invention is applied to metal-tank rectifiers, unless precautionary means are adopted, the lead of the solder, and to a smaller extent the copper also, would be attacked by mercury or mercury vapors and rendered soft and useless, so that the joint would be no longer vacuum-tight. We provide some means, therefore, for protecting our joint from the mercury or mercury vapor which is present in the rectifier.

For the purpose just mentioned, we provide a novel form of fiber washer 20, which is preferably made of asbestos because of its heat withstanding qualities. The washer is so constructed that all of its fibers are disposed at right angles to the radial direction, and the fibers are rightly compacted in both a radial direction and an axial direction in order to render the same as impervious as possible.

A preferred method of manufacturing the asbestos washer 20 consists in first winding asbestos cord or rope in a spiral formation and then pressing the whole in an axial direction, by means of a hydraulic press capable of applying a pressure such as 2,000 pounds per square inch. By this treatment, the fibers are very closely compressed together and the washer is rendered self-supporting to some extent, so that it may be handled with comparative ease.

The washer is then inserted between the abutting ends of the tubular iron projection 7 and the tubular porcelain member 6, the end surfaces of which are smooth and plane, in order to provide a proper seating for the washer. It will be understood that the washer is applied before the soldered joint is completed.

In evacuating the tank, as by means of the opening 21, we have found that it is desirable to complete the evacuation with the parts loosely assembled in position. The asbestos washers then permit the air to be withdrawn from the space adjacent to the soldered joints 14, 12, 18. By reason of the arch-like construction of the annular copper member 12 of the joint, the copper member is enabled to withstand atmospheric pressure without appreciable distortion.

After the evacuation has been completed and before the rectifier has been placed in operation, so as to vaporize the mercury cathode (not shown), the washers are very tightly compressed by means of bolts 22 which are provided for this purpose, and thus the washers are made impervious to mercury and mercury vapor, whereby the soldered joint is properly protected. It will be noted that the arch-like construction of the annular copper member 12 also provides for the slight longitudinal movement incident to the taking up of the bolts 22.

If the asbestos washers were not left in a more or less loose condition during the evacuating process, they would be almost air-tight, so that a very long time would elapse before the air was entirely exhausted from the space adjacent to the soldered joints.

In employing the term "tubular metallic projection" to refer to the part 7 and its integrally associated flange 17, we do not mean to exclude the possibility of reducing the length of the tubular part to the vanishing point, so that the tubular member becomes merely a perforation in the top plate of the rectifier tank, and we wish the terminology to be so understood, in both the specification and the claims.

While we have described our preferred metal-glazing process consisting in coating the porcelain with chloro-platinic acid suspended in esesntial oils, and baking or firing the same at a temperature of the order of 750° C, it is possible to utilize, in general, a liquid coating of any metal compound or mixture which is decomposed by heat, and then baking or firing the same to reduce the metal and at the same time drive it into intimate union, either molecular or atomic, with the porcelain or with the glazed surface of the porcelain. Other examples of such compounds or mixtures are, (1) silver nitrate mixed with a reducing agent such as sugar, (2) silver oxalate, and (3) copper acetate. If the metal coat is such as is susceptible of oxidation, the baking or firing, may be carried out in a reducing or a non-oxidizing atmosphere.

In the foregoing description, we have described our invention in a preferred construction. We desire, however, that our description and drawing should be regarded merely as illustrative, and we do not desire to be limited thereto except as may be clearly indicated by the appended claims, when read in the light of the prior art.

We claim as our invention:

1. A mercury-vapor space-current discharge device comprising an evacuated metal tank having a tubular projection, a tubular ceramic member in alinement with said tubular projection, said ceramic member being susceptible of receiving a metallic glaze, a metallic glaze on that part of its outer surface which adjoins said tubular metal-tank projection, a metal sleeve soldered to said metallic glaze and said metal-tank projection, respectively, thereby providing a vacuum-tight joint, said joint being incapable, however, of withstanding the attacks of mercury, the abutting end surfaces of said ceramic and metal tubular members being smooth, plane surfaces, a compressed fiber washer therebetween, said washer comprising closely wound spiral fibers tightly compressed in a direction parallel to the axis of the spiral and of a material which is impervious to mercury or mercury vapors, and mechanical clamping means for tightly drawing the parts together to compress said washer, said metal sleeve being so shaped as to admit the necessary motion between the two tubular members.

2. A mercury-vapor space-current discharge device comprising an evacuated metal tank having a tubular projection, a tubular ceramic member in alinement with said tubular projection, said ceramic member having a metallic glaze on that part of its outer surface which adjoins said tubular metal-tank projection, said glaze being molecularly integral with, and non-porously connected to, the body portion of said ceramic member, a metal sleeve soldered to said metallic glaze and said metal-tank projection, respectively, thereby providing a vacuum-tight joint, said joint being incapable, however of withstanding the attacks of mercury, the abutting end surfaces of said ceramic and metal tubular members having portions suitably spaced to receive a washer therebetween, a compressible washer therebetween having tightly packed fibers substantially all lying transversely to the radial direction, said washer being of a material which is impervious to mercury or mercury vapors, and mechanical clamping means for tightly drawing the parts together to compress said washer, said metal sleeve being so shaped as to admit of the necessary motion between the two tubular members.

3. A mercury-vapor space-current discharge device comprising an evacuated metal tank having a projecting tubular metal member, a tubular ceramic member in substantial axial alinement with said tubular member, said ceramic member having a ceramic glaze thereon susceptible of receiving, in turn, a metallic glaze, a metallic glaze on that part of the outer surface of said ceramic member that adjoins said tubular metal member, a metal sleeve soldered to said metallic glaze and said metal member, respectively, thereby providing a vacuum-tight joint, the abutting end surfaces of said ceramic and metal tubular members being smooth, plane surfaces, a compressed asbestos washer therebetween, said washer comprising closely wound spiral fibers tightly compressed in a direction parallel to the axis of the spiral, means for evacuating said tank, and means whereby the compression of said washer may be increased after the evacuation of said tank, whereby the space adjacent to said joint may be evacuated with the rest of the tank, if so desired.

4. A mercury-vapor space-current discharge device comprising an evacuated metal tank having a tubular projection, a tubular ceramic member in alinement with said tubular projection, said ceramic member having a ceramic glaze thereon susceptible of receiving, in turn, a metallic glaze, a metallic glaze on that part of the outer surface of said ceramic member that adjoins said tubular metal-tank projection, an annular sheet-metal member having a U-shaped cross-section, one leg of the U being soldered against said metallic glaze to make a vacuum-tight joint therewith, the metal-tank projection being provided with an annular flange and an annular groove in the face of said flange for receiving the end of the other leg of said U, solder in said groove for making a vacuum-tight joint with said U-shaped annular member, and means at the abutting end surfaces of said ceramic and tubular members for excluding mercury and mercury vapor from the space adjacent to said vacuum-tight joint.

5. A hermetically tight joint comprising a tubular metal member, a tubular ceramic member in substantial axial alinement with said tubular member, said ceramic member having a ceramic glaze thereon susceptible of receiving, in turn, a metallic glaze, a metallic glaze on that part of the outer surface of said ceramic member that adjoins said tubular metal member, a metal sleeve soldered to said metallic glaze and said metal member, respectively, thereby providing a vacuum-tight joint, the abutting end surfaces of said ceramic and metal tubular members being smooth, plane surfaces, and a compressed asbestos washer therebetween, said washer comprising closely wound spiral fibers tightly compressed in a direction parallel to the axis of the spiral.

In testimony whereof, we have hereunto subscribed our names this 26th day of July, 1927.

ERROL B. SHAND.
LLOYD SMEDE.